United States Patent
Hu et al.

(10) Patent No.: US 12,063,135 B2
(45) Date of Patent: Aug. 13, 2024

(54) DATA STREAM MULTIPLEXING METHOD AND TERMINAL

(71) Applicant: Huawei Technologies Co., Ltd., Shenzhen (CN)

(72) Inventors: Yuanzhou Hu, Shanghai (CN); Mengying Ding, Shanghai (CN); Shuri Liao, Shanghai (CN); Fan Wang, Berkshire (GB)

(73) Assignee: Huawei Technologies Co., Ltd., Shenzhen (CN)

(*) Notice: Subject to any disclaimer, the term of this patent is extended or adjusted under 35 U.S.C. 154(b) by 615 days.

(21) Appl. No.: 17/333,852

(22) Filed: May 28, 2021

(65) Prior Publication Data

US 2021/0288855 A1    Sep. 16, 2021

Related U.S. Application Data

(63) Continuation of application No. PCT/CN2019/122218, filed on Nov. 29, 2019.

(30) Foreign Application Priority Data

Nov. 30, 2018 (CN) .......................... 201811460323.3

(51) Int. Cl.
*H04L 27/26* (2006.01)
*H04L 5/00* (2006.01)

(52) U.S. Cl.
CPC ........ *H04L 27/2621* (2013.01); *H04L 5/0007* (2013.01); *H04L 5/0048* (2013.01); *H04L 27/2607* (2013.01)

(58) Field of Classification Search
None
See application file for complete search history.

(56) References Cited

U.S. PATENT DOCUMENTS

2001/0030940 A1* 10/2001 Hellberg ............... H04L 5/06
370/328
2003/0026200 A1* 2/2003 Fu .......................... H04L 5/026
370/208
(Continued)

FOREIGN PATENT DOCUMENTS

| CN | 104639281 A | 5/2015 |
| CN | 104660528 A | 5/2015 |

(Continued)

OTHER PUBLICATIONS

Huawei, HiSilicon, "Short duration UL control channel design", Jan. 16-20, 2017, 3GPP TSG RAN WG1 NR ad-Hoc Meeting, R1-1700016, pp. 1-6 (Year: 2017).*

(Continued)

*Primary Examiner* — Steve R Young
(74) *Attorney, Agent, or Firm* — Slater Matsil, LLP

(57) ABSTRACT

The method may include: determining a third frequency-domain data stream, which includes a first frequency-domain data stream and a second frequency-domain data stream, a length of the third frequency-domain data stream is 2N, lengths of both the first frequency-domain data stream and the second frequency-domain data stream are N, data in the first frequency-domain data stream and data in the second frequency-domain data stream are separately mapped to different locations in the third frequency-domain data stream, the first frequency-domain data stream is obtained by performing zero adding processing and Fourier transform processing on a first source data stream, the second frequency-domain data stream is obtained by performing cyclic extension processing on a second source data stream; converting the third frequency-domain data stream into time-domain data and sending the time-domain data to a base station.

20 Claims, 8 Drawing Sheets

(56) References Cited

U.S. PATENT DOCUMENTS

| | | |
|---|---|---|
| 2011/0075760 A1 | 3/2011 | Ogawa et al. |
| 2011/0149944 A1 | 6/2011 | Ko et al. |
| 2011/0176632 A1 | 7/2011 | Jeong et al. |
| 2012/0087393 A1 | 4/2012 | Jeong et al. |
| 2012/0213312 A1* | 8/2012 | Futatsugi .......... H04L 25/03828 375/296 |
| 2013/0157667 A1* | 6/2013 | Nakamura .......... H04B 7/0413 455/454 |
| 2016/0308646 A1* | 10/2016 | Qiao ..................... H04W 72/23 |
| 2017/0187563 A1 | 6/2017 | Shin et al. |
| 2019/0021080 A1* | 1/2019 | Lei ........................ H04B 7/10 |
| 2020/0266963 A1* | 8/2020 | Song .................. H04L 27/2613 |

FOREIGN PATENT DOCUMENTS

| | | |
|---|---|---|
| CN | 107113155 A | 8/2017 |
| CN | 107888533 A | 4/2018 |
| CN | 108289069 A | 7/2018 |
| WO | 2017092697 A1 | 6/2017 |

OTHER PUBLICATIONS

Chandrashekhar et al., "Multiplexing Reference Signals and Data in a DFT-s-OFDM Symbol", Jul. 16-19, 2018, International Conference on Signal Processing and COmmunications (SPCOM), pp. 277-281 (Year: 2018).*

Chandrashekhar, T. PS., "Multiplexing Reference Signals and Data in a DFT-s-OFDM Symbol", 2018 International Conference on Signal Processing and Communications (SPCOM), Jul. 16-19, 2018, pp. 277-281.

Qualcomm Incorporation, "Discussion on SRS Design", 3GPP TSG RAN WG1 #88bis, R1-1705595, Spokan, WA, US, Apr. 3-7, 2017, 11 pages.

Huawei et al., "Short duration UL control channel design", 3GPP TSG RAN WG1 NR Ad-Hoc Meeting,R1-1700016, Spokane, WA, US, Jan. 16-20, 2017, 6 pages.

Takyu, O. et al., "Scattered Pilot Assisted Channel Estimation for IFDMA", May 17, 2019, 5 Pages, XP031495959.

* cited by examiner

DATA STREAM MULTIPLEXING METHOD AND TERMINAL

CROSS-REFERENCE TO RELATED APPLICATIONS

This application is a continuation of International Application No. PCT/CN2019/122218, filed on Nov. 29, 2019, which claims priority to Chinese Patent Application No. 201811460323.3, filed on Nov. 30, 2018. The disclosures of the aforementioned applications are hereby incorporated by reference in their entireties.

TECHNICAL FIELD

This application relates to the field of communications technologies, and in particular, to a data stream multiplexing method and a terminal.

BACKGROUND

In a new radio (NR) system and a long term evolution (LTE) system, a terminal may perform symbol-level scheduling, for example, may send data by using some symbols in a slot. When a quantity of symbols for sending data is relatively small, if a reference signal and to-be-sent data occupy different time-domain symbols, overheads of the reference signal are relatively high and relatively serious waste of time-frequency resources is caused. Therefore, for data transmission scheduled by using these short symbols, the reference signal and the to-be-sent data may be frequency-divided in a same symbol, and overheads of the reference signal may be controlled by adjusting a quantity of reference signals in one symbol. For a single-carrier frequency-division multiple access (SC-FDMA) waveform, which may also be referred to as a discrete Fourier transform spread orthogonal frequency division multiplexing (DFT-S-OFDM) waveform, the to-be-sent data is converted into frequency-domain data by performing Fourier transform, and then the frequency-domain data and the reference signal are mapped to different subcarriers in one symbol. Then, inverse Fourier transform is performed to obtain time-domain data in one symbol. In the obtained time-domain data in one symbol, the reference signal and the to-be-sent data may overlap. As a result, a PAPR thereof is higher than a PAPR that is of an SC-FDMA waveform and that is obtained when one symbol has only to-be-sent data.

Output power obtained after a waveform with a relatively high PAPR passes through a power amplifier (PA) is lower than that obtained after a waveform with a relatively low PAPR passes through the PA. Relatively low output power means a loss of demodulation performance on a base station side.

SUMMARY

A technical problem to be resolved in embodiments of this application is to provide a data stream multiplexing method and a terminal, to adjust a PAPR when to-be-sent data and a reference signal are multiplexed, to ensure demodulation performance on a base station side.

According to a first aspect, an embodiment of this application provides a data stream multiplexing method. The method may include the following.

A terminal determines a third frequency-domain data stream, where the third frequency-domain data stream includes a first frequency-domain data stream and a second frequency-domain data stream, a length of the third frequency-domain data stream is 2N, lengths of both the first frequency-domain data stream and the second frequency-domain data stream are N, data in the first frequency-domain data stream and data in the second frequency-domain data stream are separately mapped to different locations in the third frequency-domain data stream, the first frequency-domain data stream is obtained by performing first processing on a first source data stream, the first processing includes zero adding processing and Fourier transform processing, the second frequency-domain data stream is obtained by performing second processing on a second source data stream, and the second processing includes cyclic extension processing.

The terminal converts the third frequency-domain data stream into time-domain data.

The terminal sends the time-domain data to a base station.

The terminal performs the zero adding processing on the first source data stream and performs the cyclic extension processing on the second source data stream, so that the two frequency-domain data streams have a same length and both lengths are N. Then, when the terminal combines the two frequency-domain data streams into the third frequency-domain data stream, and converts the third frequency-domain data stream into the time-domain data, a data stream obtained through cyclic extension is filled in a zero-added location in a zero-added data stream in time domain, thereby avoiding signal overlapping and reducing a PAPR value to obtain a PAPR that is basically the same as that obtained when a time-domain symbol has only data, to ensure demodulation performance on a base station side.

In a possible implementation, a length of the first source data stream is $N(K-1)/K$ a length of the second source data stream is $N/K$, the zero adding processing includes adding $N/K$ zeros to the first source data stream to obtain a first zero-added data stream having a length of N, and locations of the $N/K$ zeros in the first zero-added data stream are $k+p \times K$ where P is each integer from 0 to $N/K-1$, k is a value from 0 to $K-1$, k is an integer, N is a positive integer, and K is a positive integer greater than 1, where the Fourier transform processing includes performing Fourier transform processing on the first zero-added data stream.

When the first frequency-domain data stream and the second frequency-domain data stream are processed in the foregoing manner, it can be ensured that data of the first frequency-domain data stream in the third frequency-domain data stream and data of the second frequency-domain data stream in the third frequency-domain data stream do not overlap in time domain, thereby ensuring a relatively low PAPR.

In a possible implementation, $k=0$. When $k=0$, phase rotation may not be performed on the second frequency-domain data stream, and the two data streams may be directly combined in frequency domain.

In a possible implementation, first indication information is received from the base station, where the first indication information indicates a value of K.

In a possible implementation, a power ratio of the first frequency-domain data stream to the second frequency-domain data stream is $(K-1):1$.

In a possible implementation, the second processing further includes power adjustment processing, and a power adjustment factor used in the power adjustment processing is $H=1/\sqrt{K}$.

In a possible implementation, the second processing further includes phase rotation processing, and a phase rotation factor of the phase rotation processing is $$e^{j\alpha_k n} = e^{\frac{-j2\pi kn}{N}},$$

n=0, 1, 2, ..., N−1, e is a base of a natural logarithm, and j is an imaginary unit.

In a possible implementation, the first source data stream is a modulated data stream, and the second source data stream is a second reference signal stream; or the first source data stream is a first reference signal stream, and the second source data stream is obtained by performing Fourier transform processing on a second modulated data stream.

In a possible implementation, the method further includes: receiving second indication information from the base station, where the second indication information indicates that the first source data stream is a first modulated data stream and the second source data stream is the second reference signal stream; or the second indication information indicates that the first source data stream is the first reference signal stream and the second source data stream is obtained by performing Fourier transform processing on the second modulated data stream.

In a possible implementation, the data in the first frequency-domain data stream is mapped to an odd-number location in the third frequency-domain data stream, and the data in the second frequency-domain data stream is mapped to an even-number location in the third frequency-domain data stream; or the data in the first frequency-domain data stream is mapped to an even-number location in the third frequency-domain data stream, and the data in the second frequency-domain data stream is mapped to an odd-number location in the third frequency-domain data stream.

In a possible implementation, $N=N_{SC}/2$, where $N_{SC}$ is a quantity of subcarriers corresponding to a bandwidth allocated to the terminal.

According to a second aspect, an embodiment of this application provides a terminal. The terminal may include: a processing unit, configured to: determine a third frequency-domain data stream, where the third frequency-domain data stream includes a first frequency-domain data stream and a second frequency-domain data stream, a length of the third frequency-domain data stream is 2N, lengths of both the first frequency-domain data stream and the second frequency-domain data stream are N, data in the first frequency-domain data stream and data in the second frequency-domain data stream are separately mapped to different locations in the third frequency-domain data stream, the first frequency-domain data stream is obtained by performing first processing on a first source data stream, the first processing includes zero adding processing and Fourier transform processing, the second frequency-domain data stream is obtained by performing second processing on a second source data stream, and the second processing includes cyclic extension processing; and convert the third frequency-domain data stream into time-domain data; and a transceiver unit, configured to send the time-domain data to a base station.

In a possible implementation, a length of the first source data stream is N (K−1)/K, a length of the second source data stream is N/K, the zero adding processing includes adding N/K zeros to the first source data stream to obtain a first zero-added data stream having a length of N, and locations of the N/K zeros in the first zero-added data stream are k+p×K where P is each integer from 0 to N/K−1, k is a value from 0 to K−1, k is an integer, N is a positive integer, and K is a positive integer greater than 1, where the Fourier transform processing includes performing Fourier transform processing on the first zero-added data stream.

In a possible implementation, k=0.

In a possible implementation, the transceiver unit is further configured to: receive first indication information from the base station, where the first indication information indicates a value of K.

In a possible implementation, a power ratio of the first frequency-domain data stream to the second frequency-domain data stream is (K−1):1.

In a possible implementation, the second processing further includes power adjustment processing, and a power adjustment factor used in the power adjustment processing is $H=1/\sqrt{K}$.

In a possible implementation, the second processing further includes phase rotation processing, and a phase rotation factor of the phase rotation processing is $$e^{j\alpha_k n} = e^{\frac{-j2\pi kn}{N}},$$

n=0, 1, 2, ..., N−1, e is a base of a natural logarithm, and j is an imaginary unit.

In a possible implementation, the first source data stream is a modulated data stream, and the second source data stream is a second reference signal stream; or the first source data stream is a first reference signal stream, and the second source data stream is obtained by performing Fourier transform processing on a second modulated data stream.

In a possible implementation, the transceiver unit is further configured to: receive second indication information from the base station, where the second indication information indicates that the first source data stream is a first modulated data stream and the second source data stream is the second reference signal stream; or the second indication information indicates that the first source data stream is the first reference signal stream and the second source data stream is obtained by performing Fourier transform processing on the second modulated data stream.

In a possible implementation, the data in the first frequency-domain data stream is mapped to an odd-number location in the third frequency-domain data stream, and the data in the second frequency-domain data stream is mapped to an even-number location in the third frequency-domain data stream; or the data in the first frequency-domain data stream is mapped to an even-number location in the third frequency-domain data stream, and the data in the second frequency-domain data stream is mapped to an odd-number location in the third frequency-domain data stream.

According to a third aspect, an embodiment of this application provides a communications apparatus. The communications apparatus may be a terminal or a chip in a terminal. The communications apparatus includes a processor, the processor is coupled to a memory, the memory is configured to store a computer program or instructions, and the processor is configured to execute the computer program or the instructions in the memory, so that the communications apparatus performs the method according to the first aspect. Optionally, the communications apparatus further includes the memory.

According to a fourth aspect, an embodiment of this application provides a computer storage medium. The storage medium is configured to store a computer program or instructions. When the program is run on a computer, the computer is enabled to perform the method according to any one of the first aspect or the implementations of the first aspect.

According to a fifth aspect, an embodiment of this application provides a computer program product. The program product includes a program, and when the program is run, the method according to any one of the first aspect or the implementations of the first aspect is performed.

BRIEF DESCRIPTION OF THE DRAWINGS

To describe the technical solutions in the embodiments of this application or in the background more clearly, the following describes the accompanying drawings used for describing the embodiments of this application or the background.

DETAILED DESCRIPTION OF ILLUSTRATIVE EMBODIMENTS

The following describes the embodiments of this application with reference to the accompanying drawings in the embodiments of this application.

The terms "including", "comprising", or any other variant thereof mentioned in the specification, claims, and the accompanying drawings of this application, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
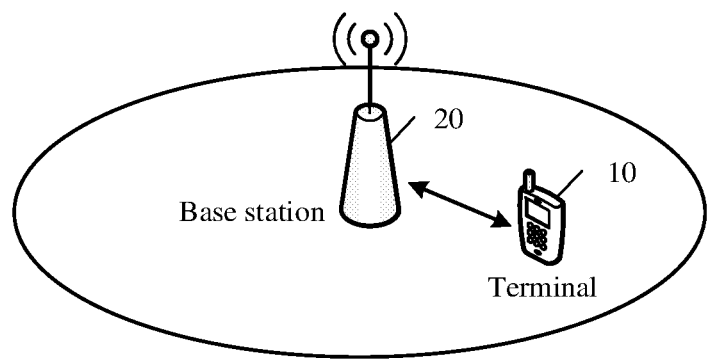
FIG. 1 is a schematic architectural diagram of a data stream multiplexing system according to an embodiment of this application.

FIG. 1 is a schematic architectural diagram of a data stream multiplexing system according to an embodiment of this application. The system may include, but is not limited to, a terminal 10 and a base station 20.

The terminal 10 in this embodiment of this application may also be referred to as a terminal device, and may be a device with a wireless transceiver function. The terminal 10 may be deployed on land, including an indoor or outdoor scenario and a handheld or an in-vehicle scenario, or may be deployed on water (for example, a ship), or may be deployed in the air (for example, an airplane, a balloon, or a satellite). The terminal 10 may be user equipment (user equipment, UE). The UE includes a handheld device, a vehicle-mounted device, a wearable device, or a computing device that has a wireless communications function. For example, the UE may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, and the like. In this embodiment of this application, an apparatus configured to implement a function of the terminal may be a terminal, or may be an apparatus that can support the terminal in implementing the function, for example, a chip system. In this embodiment of this application, the chip system may include a chip, or may include a chip and another discrete device. In technical solutions provided in the embodiments of this application, an example in which the apparatus configured to implement the function of the terminal is a terminal and the terminal is UE is used to describe the technical solutions provided in the embodiments of this application.

The base station 20 (BS) in this embodiment of this application may be a device that is deployed in a radio access network and that can perform wireless communication with a terminal. The base station 20 may have a plurality of forms, for example, a macro base station, a micro base station, a relay station, and an access point. For example, the base station 20 in this embodiment of this application may be a base station in 5G or a base station in LTE, and the base station in 5G may also be referred to as a transmission reception point (TRP) or a gNB (gNodeB). In this embodiment of this application, an apparatus configured to implement a function of the base station may be a base station, or may be an apparatus that can support the base station in implementing the function, for example, a chip system. In technical solutions provided in the embodiments of this application, an example in which the apparatus configured to implement the function of the base station is a base station is used to describe the technical solutions provided in the embodiments of this application.

The base station may exchange information with UE or configure a parameter for UE by using semi-static signaling and/or dynamic signaling. In this embodiment of this application, the semi-static signaling may be radio resource control (RRC) signaling, a broadcast message, a system message, or a media access control (MAC) control element (CE). The broadcast message may include remaining minimum system information (RMSI).

In this embodiment of this application, the dynamic signaling may be physical layer signaling. The physical layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type (MTC) communication physical downlink control channel MPDCCH. Signaling carried on the PDCCH or the EPDCCH may also be referred to as downlink control information (DCI). The physical control channel may alternatively be a physical sidelink control channel (PSCH). Signaling carried on the physical sidelink control channel may also be referred to as sidelink control information (SCI).

The following describes in detail a data stream multiplexing method in this application with reference to FIG. 2 to FIG. 5b.

Figure 2:
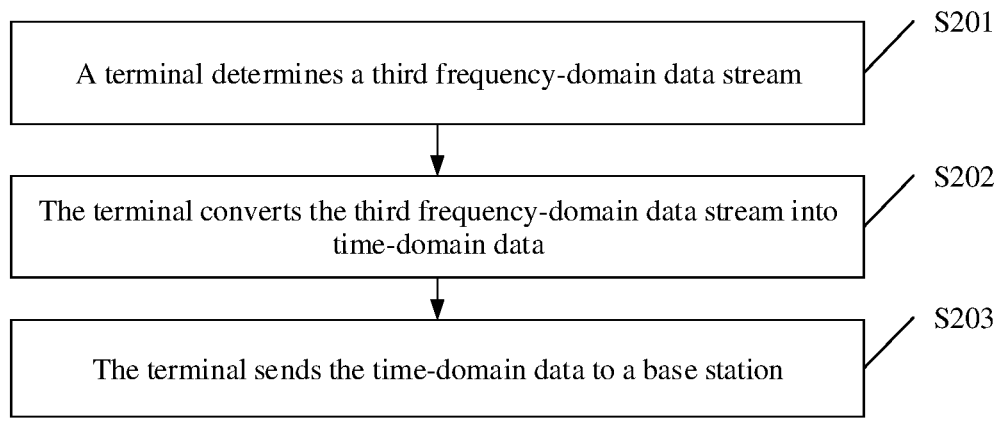
FIG. 2 is a schematic flowchart of a data stream multiplexing method according to an embodiment of this application.
Figure 3A:
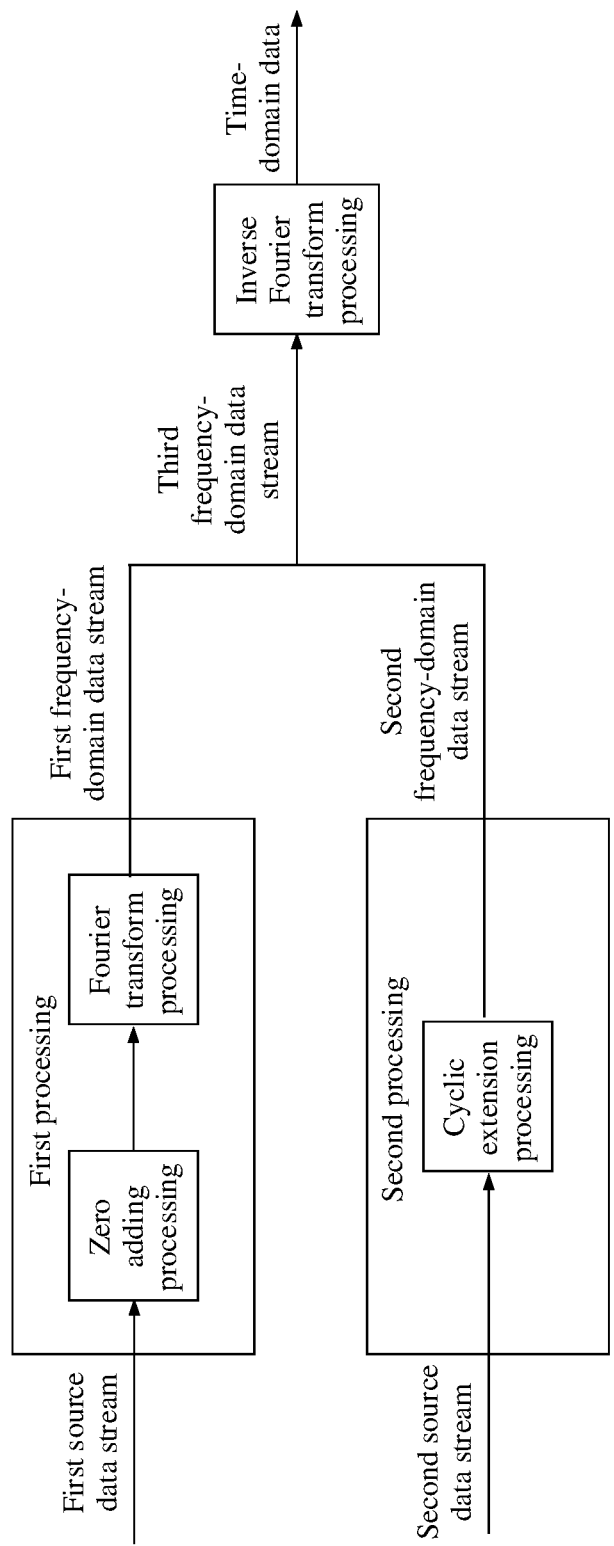
FIG. 3a is a schematic flowchart of data stream processing in the method shown in FIG. 2.

Refer to FIG. 2 and FIG. 3a. FIG. 2 is a schematic flowchart of a data stream multiplexing method according to an embodiment of this application. FIG. 3a is a schematic flowchart of data stream processing in the method shown in FIG. 2. The method shown in FIG. 2 specifically includes the following steps.

S201. A terminal determines a third frequency-domain data stream.

The third frequency-domain data stream includes a first frequency-domain data stream and a second frequency-domain data stream, a length of the third frequency-domain data stream is 2N, and lengths of both the first frequency-domain data stream and the second frequency-domain data stream are N.

The length of the third frequency-domain data stream being 2N indicates that the third frequency-domain data stream includes 2N pieces of data (or indicates that the third frequency-domain data stream includes 2N elements). The lengths of both the first frequency-domain data stream and the second frequency-domain data stream being N indicates that each of the first frequency-domain data stream and the second frequency-domain data stream includes N pieces of data (or indicates that each of the first frequency-domain data stream and the second frequency-domain data stream includes N elements).

Data in the first frequency-domain data stream and data in the second frequency-domain data stream are separately mapped to different locations in the third frequency-domain data stream.

This may be understood as that a frequency-domain resource location to which the first frequency-domain data stream is mapped through resource mapping is different from a frequency-domain resource location to which the second frequency-domain data stream is mapped through resource mapping. For example, the first frequency-domain data stream may be mapped to N subcarriers and the second frequency-domain data stream may be mapped to N subcarriers. The N subcarriers to which the first frequency-domain data stream is mapped are different from the N subcarriers to which the second frequency-domain data stream is mapped.

Optionally, the data in the first frequency-domain data stream is at an odd-number location in the third frequency-domain data stream, and the data in the second frequency-domain data stream is at an even-number location in the third frequency-domain data stream.

For example, when N is 12, indexes of locations in the third frequency-domain data stream having a length of 24 are each of 0 to 23. Data in the first frequency-domain data stream having a length of 12 may be sequentially mapped to locations whose indexes are 1, 3, 5, 7, 9, 11, 13, 15, 17, 19, 21, and 23 in the third frequency-domain data stream having the length of 24. Data in the second frequency-domain data stream having a length of 12 may be sequentially mapped to locations whose indexes are 0, 2, 4, 6, 8, 10, 12, 14, 16, 18, 20, and 22 in the third frequency-domain data stream having the length of 24.

Optionally, the data in the first frequency-domain data stream is at an even-number location in the third frequency-domain data stream, and the data in the second frequency-domain data stream is at an odd-number location in the third frequency-domain data stream.

Figure 3B:
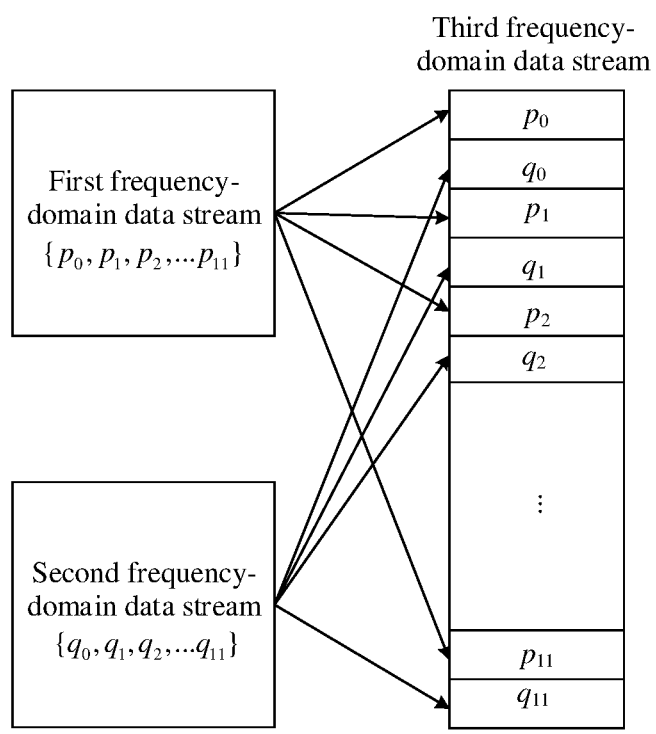
FIG. 3b is a schematic diagram of mapping in frequency domain during data stream multiplexing in the method shown in FIG. 2.

For example, FIG. 3b is a schematic diagram of mapping in frequency domain during data stream multiplexing in the method shown in FIG. 2. When N is 12, indexes of locations in the third frequency-domain data stream having a length of 24 are each of 0 to 23. Data in the first frequency-domain data stream having a length of 12 includes a total of 12 pieces of data $\{p_0, p_1, p_2, \ldots p_{11}\}$, and may be sequentially mapped to locations whose indexes are 0, 2, 4, 6, 8, 10, 12, 14, 16, 18, 20, and 22 in the third frequency-domain data stream having the length of 24. Data in the second frequency-domain data stream having a length of 12 includes a total of 12 pieces of data $\{q_0, q_1, q_2, \ldots q_{11}\}$, and may be sequentially mapped to locations whose indexes are 1, 3, 5, 7, 9, 11, 13, 15, 17, 19, 21, and 23 in the third frequency-domain data stream having the length of 24.

The first frequency-domain data stream is obtained by performing first processing on a first source data stream. The first processing may include zero adding processing and Fourier transform processing. The second frequency-domain data stream is obtained by performing second processing on a second source data stream. The second processing may include cyclic extension processing.

Optionally, the zero adding may include: zero adding based on an interval K, and the adding zeros based on an interval K may be understood as follows: an interval between two adjacent zeros in a first zero-added data stream is K.

Optionally, the cyclic extension may include repeating, for example, repeating for K times.

Optionally, a zero adding interval and a quantity of repetitions are the same, for example, both are K.

The zero adding interval and the quantity of repetitions are the same, so that the two frequency-domain data streams may be mapped to the third frequency-domain data stream, and after the third frequency-domain data stream is converted into time-domain data, data in a repeated data stream may be supplemented to a zero-added location in the zero-added data stream, thereby avoiding data overlapping and ensuring a desirable PAPR, to ensure demodulation performance on a base station side.

Optionally, a length of the first source data stream is N(K−1)/K, the zero adding processing includes adding N/K zeros to the first source data stream to obtain the first zero-added data stream having a length of N, and locations of the N/K zeros in the first zero-added data stream are k+p×K, where P is each integer from 0 to N/K−1, k is a value from 0 to K−1 and k is an integer, N is a positive integer, and K is a positive integer, for example, K is a positive integer greater than 1, for example, K may be 2, 3, 4, or more.

Optionally, a value of K may be indicated by a base station, and the terminal may receive first indication information from the base station, where the first indication information indicates the value of K. The value of k may be indicated by signaling sent by the base station, or may be preconfigured in the terminal and the base station.

Optionally, signaling that carries the first indication information may be semi-static signaling and/or dynamic signaling.

It may be understood that during the zero adding processing, the zero adding processing may be performed on the first source data stream based on the interval K to obtain the first zero-added data stream, and then the Fourier transform processing is performed on the first zero-added data stream to obtain the first frequency-domain data stream. k may be understood as a start position of zero adding.

Optionally, k=0. This may be understood as that the first zero is placed before the first data location in the first source data stream, or this may be understood as that the first data of the first zero-added data stream is zero, or this may be understood as that a mapping start point of zero is 0.

Optionally, a length of the second source data stream is N/K, and the cyclic extension processing may be performing cyclic extension on the second source data stream having the length of N/K to obtain the second frequency-domain data stream having a length of N.

N/K is a positive integer. Optionally, the cyclic extension processing may be repeating the second source data stream having the length of N/K for K times to obtain the second frequency-domain data stream having a length of N.

Optionally, a power ratio of the first frequency-domain data stream to the second frequency-domain data stream is (K−1):1.

Optionally, the second processing further includes power adjustment processing, and a power adjustment factor used in the power adjustment processing is $H=1/\sqrt{K}$. The power adjustment factor is adjusted, so that the power ratio of the first frequency-domain data stream to the second frequency-domain data stream may be (K−1):1. Certainly, it may be that $H=a/\sqrt{K}$, where a is a constant, to implement more flexible power adjustment in different scenarios.

Optionally, the second processing further includes phase rotation processing, and a phase rotation factor of the phase rotation processing is $$e^{j\alpha_k n} = e^{\frac{-j2\pi k n}{N}},$$

n=0, 1, 2, . . . , N−1, e is a base of a natural logarithm, and j is an imaginary unit.

The second frequency-domain data stream is obtained by performing phase rotation processing, so that when the third frequency-domain data stream is generated, the data in the second frequency-domain data stream and the data in the first frequency-domain data stream are staggered in time domain, thereby ensuring a relatively desirable PAPR and helping to ensure demodulation performance on a base station side.

S202. The terminal converts the third frequency-domain data stream into time-domain data.

Optionally, during transform, inverse Fourier transform may be performed on the third frequency-domain data stream to obtain the time-domain data, or after inverse Fourier transform is separately performed on the first frequency-domain data stream and the second frequency-domain data stream, time-domain data may be combined.

In a first implementation, inverse Fourier transform may be performed on the third frequency-domain data stream to obtain the time-domain data.

In a second implementation, the terminal may alternatively perform resource mapping and inverse Fourier transform on the first frequency-domain data stream to obtain first time-domain data, perform resource mapping and inverse Fourier transform on the second frequency-domain data stream to obtain second time-domain data, and combine the first time-domain data and the second time-domain data to obtain the time-domain data.

As can be learned, the foregoing two implementations of obtaining the time-domain data may be equivalent. Energy of data at some locations in the first time-domain data generated in this application is very low and is close to 0. In the second time-domain data generated in this application, energy of data at some locations is relatively high, and energy of data at other locations is very low and is close to 0. The some locations in the second time-domain data are the same as the some locations in the first time-domain data. Therefore, when the first time-domain data and the second time-domain data are combined, overlapping of high-energy data can be significantly avoided, thereby reducing a PAPR.

In addition, in the present invention, the value of K can be adjusted to flexibly adjust a ratio of a length of the first source data stream to a length of the second source data stream, to adjust a ratio of a length of a reference signal to a length of modulated data.

Optionally, in a first implementation, inverse Fourier transform and cyclic prefix (cyclic prefix, CP) adding may be alternatively performed on the third frequency-domain data stream to obtain the time-domain data.

Optionally, in a second implementation, the terminal may alternatively sequentially perform resource mapping, inverse Fourier transform, and cyclic prefix adding on the first frequency-domain data stream to obtain first time-domain data, sequentially perform resource mapping, inverse Fourier transform, and cyclic prefix adding on the second frequency-domain data stream to obtain second time-domain data, and combine the first time-domain data and the second time-domain data to obtain the time-domain data.

S203. The terminal sends the time-domain data to a base station.

In the method in FIG. 2, the terminal performs the zero adding processing on the first source data stream and performs the cyclic extension processing on the second source data stream, so that the two frequency-domain data streams have a same length and both lengths are N. Then, when the terminal combines the two frequency-domain data streams into the third frequency-domain data stream, and converts the third frequency-domain data stream into the time-domain data, a data stream obtained through cyclic extension is filled in a zero-added location in a zero-added data stream in time domain, thereby avoiding signal overlapping and reducing a PAPR value to obtain a PAPR that is basically the same as that obtained when a time-domain symbol has only data, to ensure demodulation performance on a base station side.

Figure 4:
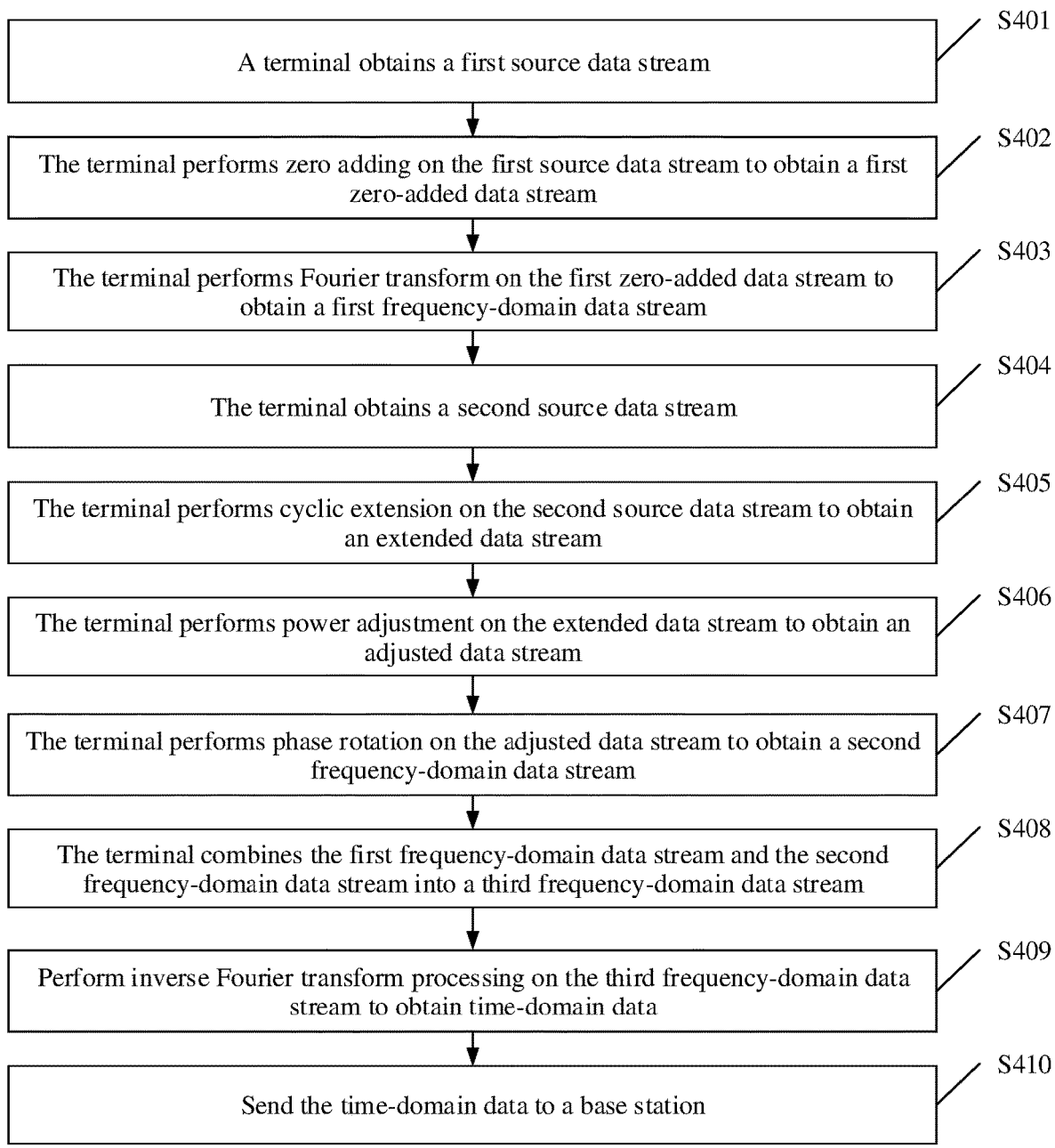
FIG. 4 is a schematic flowchart of a method for generating a third frequency-domain data stream by a terminal according to an embodiment of this application.
Figure 5A:
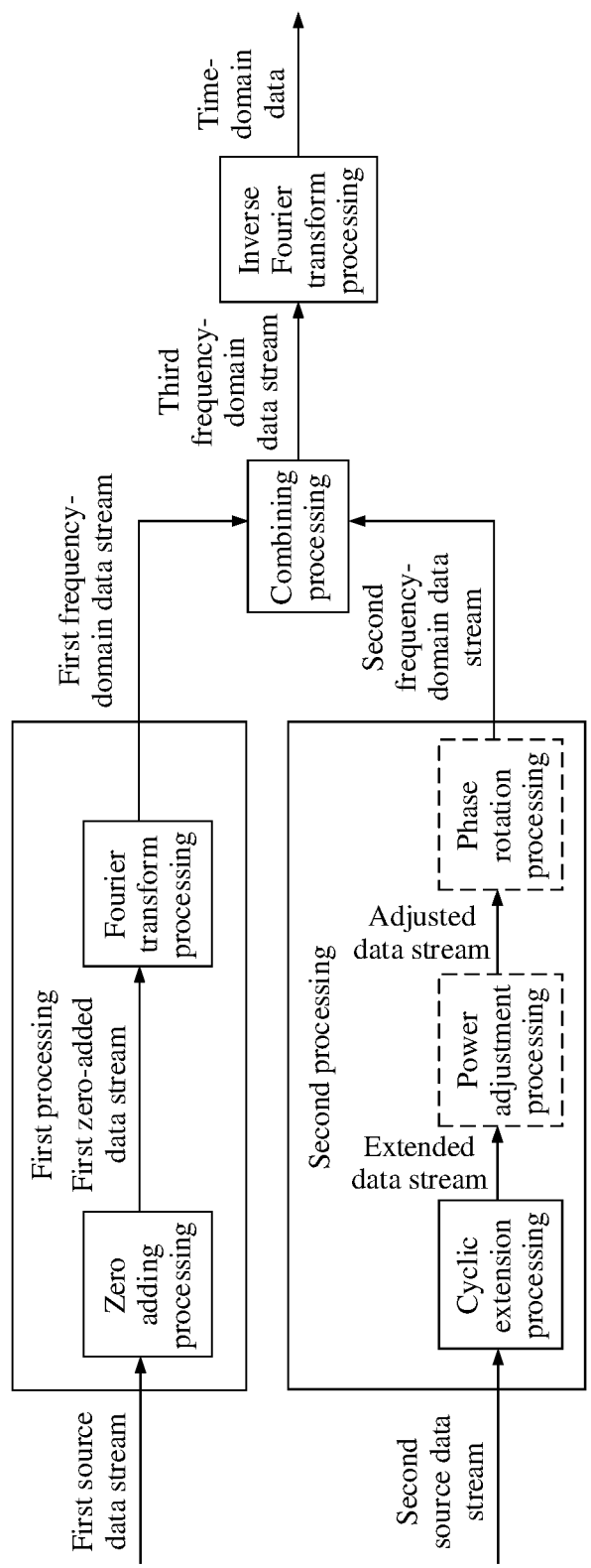
FIG. 5a is a schematic flowchart of data stream processing in the method shown in FIG. 4.

Refer to both FIG. 4 and FIG. 5a. FIG. 4 is a schematic flowchart of a method for generating to-be-sent frequency-domain data by a terminal according to an embodiment of this application. FIG. 5a is a schematic flowchart of data stream processing in the method shown in FIG. 4. In this embodiment, the method shown in FIG. 4 includes the following steps.

S401. A terminal obtains a first source data stream.

A length of the first source data stream is $M_0$, where $M_0=N(K−1)/K$.

Optionally, the first source data stream may be represented as $d_s^0(m)$, where m=0, 1, 2 . . . , and $M_0−1$, and m is represented as a data sequence number (or a data index), for example, $d_s^0(0)$ indicates data whose data index is 0 in $d_s^0(m)$.

Optionally, before S401, the terminal may determine a value of K and a value of N.

A base station may indicate K to the terminal. For example, RRC signaling or DCI sent by the base station to the terminal carries indication information, where the indication information indicates K; or K may be set to a fixed value and the fixed value may be configured in the base station and the terminal. For example, the base station and the terminal may store the fixed value.

The base station may indicate N to the terminal. For example, RRC signaling or DCI sent by the base station to the terminal carries indication information, where the indication information indicates N; or N may be implicitly determined, for example, both the base station and the terminal may determine N based on an allocated bandwidth. If a quantity of subcarriers corresponding to a bandwidth allocated to the terminal is $N_{SC}$, it can be learned that $N=N_{SC}/2$.

Optionally, $N=N_{SC}/2$, where $N_{SC}$ is the quantity of subcarriers corresponding to the bandwidth allocated to the terminal.

Optionally, the base station may indicate $N_{SC}$. Alternatively, the base station may indicate a quantity of available resource blocks of the terminal, and the terminal may determine $N_{SC}$ based on the quantity of available resource blocks.

S402. The terminal performs zero adding on the first source data stream to obtain a first zero-added data stream.

The terminal may add N/K zeros, and a length of the first zero-added data stream is N. The first zero-added data stream may be represented as $d_{padzero}(n)$, where n=0, 1, 2 ..., and N−1, and n is a data index in the first zero-added data stream, for example, $d_{padzero}(0)$ indicates data whose data index is 0 in $d_{padzero}(n)$.

Optionally, the N/K zeros may be sequentially arranged based on an interval K. This may be understood as that locations of the N/K zeros in the first zero-added data stream are k+p×K, where p is each integer from 0 to N/K−1, k is a value from 0 to K−1, k is an integer, N is a positive integer, and K is a positive integer.

Optionally, the first source data stream is arranged in remaining positions in the first zero-added data stream other than a position of zero. For example, the first source data stream is sequentially arranged in remaining positions in the first zero-added data stream other than a position of zero.

Optionally, k=0.

Optionally, a process of obtaining the first zero-added data stream through a zero adding operation may be represented by an expression. For example, k=0. A possible expression is:

$$d_{padzero}(n) = \begin{cases} 0, & n \bmod K - 0 \\ d_s^0(n - \lceil n/K \rceil), & n \bmod K \neq 0 \end{cases}.$$

mod indicates a modulo operation. For example, 2 mod 5=2, and 13 mod 5=3. $\lceil \ \rceil$ in the formula indicates a rounding-up operation.

For example, N=12 and K=4. A quantity of zeros added in zero adding is 12/4=3, a length of the first source data stream is 12−3=9, and data sequence numbers in the zero-added data stream having a length of N=12 are 0 to 11. Assuming that a mapping start point k=2, three pieces of data, that is, zeros, are mapped to locations 2, 6, and 10 in the zero-added data stream. Locations of the first source data stream in the zero-added data stream are 0, 1, 3, 4, 5, 7, 8, 9, and 11.

That is, $d_{padzero}=[d_s^0(0), d_s^0(1), 0, d_s^0(2), d_s^0(3), d_s^0(4), 0, d_s^0(5), d_s^0(6), d_s^0(7), 0, d_s^0(8)]$.

Optionally, before S402, the terminal may determine a value of k.

A base station may indicate k to the terminal. For example, RRC signaling or DCI sent by the base station to the terminal carries indication information, where the indication information indicates k; or k may be set to a fixed value and the fixed value may be configured in the base station and the terminal. For example, the base station and the terminal may store the fixed value.

S403. The terminal performs Fourier transform on the first zero-added data stream to obtain a first frequency-domain data stream.

The Fourier transform is performed on the zero-added data stream $d_{padzero}$ to obtain the first frequency-domain data stream $d_{fre}^0$, which may be represented as follows:

$$d_{fre}^0(n') = \frac{1}{\sqrt{N_{scale}^{fft}}} \sum_{n=0}^{N} d_{padzero}(n) e^{\frac{-j2\pi n'n}{N}}, n' = 0, 1, 2, \ldots, N-1,$$

where j is an imaginary unit, and e is a base of a natural logarithm.

The Fourier transform may be discrete Fourier transform (Discrete Fourier Transform, DFT) or fast Fourier transform (Fast Fourier Transform, FFT). This is not limited in this application.

$N_{scale}^{fft}$ is a coefficient for adjusting power of output data obtained through the Fourier transform, $N_{scale}^{fft}$ is a real number, for example, $N_{scale}^{fft}=N$, and $d_{fre}^0(n')$ is $n'^{th}$ data in $d_{fre}^0$.

S404. The terminal obtains a second source data stream.

A length of the second source data stream is $M_1$, where $M_1=N/K$.

Optionally, the second source data stream may be represented as $d_s^1(m)$, m=0, 1, 2 ..., and $M_1-1$, m is represented as a data sequence number (or a data index), and $M_1<N$.

A sequence of generating the first frequency-domain data stream and generating the second frequency-domain data stream is not limited in this embodiment of this application. For example, S401 to S403 may be first performed, and then S404 to S408 may be performed. Alternatively, S404 to S408 may be first performed, and then S401 to S403 may be performed. Alternatively, S401 to S403 and S404 to S408 may be performed simultaneously.

S405. The terminal performs cyclic extension on the second source data stream to obtain an extended data stream.

After a cyclic extension operation is performed on the second source data stream, an extended data stream $d_{extension}$ having a length of N is obtained, and may be represented as follows:

$$d_{extension}(n)=d_s^1(n \bmod M_1), n=0,1,2,\ldots,N-1.$$

$d_{extension}(n)$ is $n^{th}$ data in $d_{extension}$. When $M_1=N/K$, it can be learned that the cyclic extension processing represented by the above formula is equivalent to processing of repeated operations, that is, is equivalent to that the second source data stream having the length of $M_1$ is repeated for K times to obtain an extended data stream having a length of N. When $M_1 \neq N/K$, after several times of cyclic extension, the front part of data of the second source data stream may be sequentially supplemented to the second frequency-domain data stream in the last time of cyclic extension, so that the length of the second frequency-domain data stream is N.

S406. The terminal performs power adjustment on the extended data stream to obtain an adjusted data stream.

The power adjustment processing may be performed on the extended data stream to obtain the adjusted data stream, which is specifically as follows:

$$d_{adjustment}(n)=H \cdot d_{extension}(n)=H \cdot d_s^1(n \bmod M_1), n=0,1,2,\ldots,N-1.$$

$d_{adjustment}(n)$ is $n^{th}$ data in $d_{adjustment}$, and H is a power adjustment factor and is used to adjust power of the extended data stream.

Optionally, H is a function using the interval K as an independent variable, and different values of H may be obtained by adjusting the value of K, to achieve different power adjustment effects.

Optionally, the value of H can be flexibly adjusted according to requirements on a channel environment and receiver performance.

For example, H may be represented as $H=a/\sqrt{K}$, where a is indicated by signaling, and a may be a real number.

Optionally, when @=1, $H=1/\sqrt{K}$.

Certainly, a may be alternatively adjusted to another value to flexibly adjust the power of the second frequency-domain data stream, to adapt to different scenario requirements.

When a=1, a ratio of power corresponding to the first frequency-domain data stream to the power corresponding to the second frequency-domain data stream is approximately (K−1):1. In this case, a PAPR is preferable. For example, when a signal carried in the second frequency-domain data stream is a reference signal, power of to-be-sent data is approximately K−1 times of power of the reference signal. In this way, when a channel environment is very desirable, channel estimation is relatively accurate. Therefore, power of the reference signal is reduced and the power of the data is increased, so that a performance gain can be obtained.

The value of H is flexibly adjusted, so that a power ratio between the two frequency-domain data streams can be flexibly adjusted based on an actual channel environment to obtain better performance. For example, when the signal carried in the second frequency-domain data stream is to-be-sent data, power of a reference signal is approximately K−1 times of power of the to-be-sent data. When a channel environment is relatively poor, a performance gain can be obtained. In addition, the value of H is flexibly adjusted, so that a power ratio between the two frequency-domain data streams can be flexibly adjusted based on an actual channel environment to obtain better performance.

S406 is optional.

S407. The terminal performs phase rotation on the adjusted data stream to obtain a second frequency-domain data stream.

Optionally, a phase rotation operation may be performed on the adjusted data stream $d_{adjustment}$ having the length of N, to obtain the second frequency-domain data stream $d_{rotate}$ having the length of N. A phase rotation angle may be determined based on a phase factor, for example, is $n^{th}$ data $d_{adjustment}(n)$ in the adjusted data stream multiplied by a phase factor $e^{j\alpha_k n}$. A parameter $a_k$ in the phase factor is determined based on a specific mapping start point k for mapping data zero. The phase rotation is performed in frequency domain and the phase rotation is correlated with k, so that data shift can be implemented in time domain and locations of data in the combined third frequency-domain data stream are staggered, thereby ensuring a better PAPR. In this way, desirable demodulation performance can be obtained during subsequent sending on a base station side.

Optionally, in a possible implementation, $$e^{j\alpha_k n} = e^{\frac{-j2\pi kn}{N}},$$

Therefore, the rotated data stream may be represented as:

$$d_{rotate}(n) = d_{adjustment}(n)e^{j\alpha_k n} = d_{adjustment}(n)e^{\frac{-j2\pi kn}{N}},$$

where $d_{rotate}(n)$ is the $n^{th}$ data in $d_{rotate}$.

The rotated data stream is the second frequency-domain data stream $d_{fre}^1$ and may be represented as:

$d_{fre}^1(n)=d_{rotate}(n)$.

It should be noted that when zero adding is performed on the first source data stream, and a mapping start point k for mapping data zero is 0, it can be known that the phase factor is $e^{j\alpha_k n}=1$. In this case, the second frequency-domain data stream is the same as the adjusted data stream, and no phase rotation operation needs to be performed.

Optionally, the terminal may further perform the phase rotation on the extended data stream to obtain the second frequency-domain data stream. In this case, the second frequency-domain data stream may be represented as:

$$d_{roate}^1(n) = d_{extension}(n)e^{j\alpha_k n} = d_{extension}(n)e^{\frac{-j2\pi kn}{N}}$$

$$d_{fre}^1(n) = d_{rotate}(n).$$

S407 is optional.

S408. The terminal combines the first frequency-domain data stream and the second frequency-domain data stream into the third frequency-domain data stream.

Optionally, combining processing herein may be understood as resource mapping, for example, frequency-domain resource mapping.

The length of the first frequency-domain data stream is N and the first frequency-domain data stream may be mapped to N subcarriers. This may be understood as that N pieces of data in the first frequency-domain data stream are in a one-to-one correspondence with the N subcarriers. The length of the second frequency-domain data stream is N and the second frequency-domain data stream may be mapped to N subcarriers. This may be understood as that N pieces of data in the second frequency-domain data stream are in a one-to-one correspondence with the N subcarriers. Each of the N subcarriers to which the first frequency-domain data stream is mapped is different from each of the N subcarriers to which the second frequency-domain data stream is mapped. The first frequency-domain data stream and the second frequency-domain data stream are mapped to a total of 2N subcarriers, and data mapped to the 2N subcarriers may be referred to as the third frequency-domain data stream.

The third frequency-domain data stream is obtained by performing a combining operation on the two frequency-domain data streams both having the length of N. A length of the combined third frequency-domain data stream is 2N and is the same as a quantity of subcarriers corresponding to a bandwidth allocated to the terminal. Locations to which the two frequency-domain data streams are mapped do not overlap.

In a possible implementation, both the first frequency-domain data stream and the second frequency-domain data stream are mapped to to-be-sent frequency-domain data at a preset interval of two, and mapping start points are different. If locations of the first frequency-domain data stream in the to-be-sent frequency-domain data are 0, 2, 4, 6, 8, . . . , and 2N−2, locations of the second frequency-domain data stream in the to-be-sent frequency-domain data are 1, 3, 5, 7, 9, . . . , and 2N−1, and vice versa. Assuming that the to-be-sent frequency-domain data is represented by $d_{fre}(n)$, n=0, 1, 2, . . . , 2N−1, the to-be-sent frequency-domain data may be represented as follows:

$$d_{fre}(n) = \begin{cases} d_{fre}^0(\lfloor n/2 \rfloor), & n \bmod 2 = k_0 \\ d_{fre}^1(\lfloor n/2 \rfloor), & n \bmod 2 = 1 - k_0 \end{cases}.$$

$k_0$ indicates a mapping start point of the first frequency-domain data stream in the to-be-sent frequency-domain data, and has a value of 0 or 1. Correspondingly, $1-k_0$ is a mapping start point of the second frequency-domain data stream in the to-be-sent frequency-domain data. $\lfloor \ \rfloor$ indicates a rounding-down operation.

S409. Perform inverse Fourier transform processing on the third frequency-domain data stream to obtain time-domain data.

After the mapping is completed, the terminal may convert the to-be-sent frequency-domain data into time-domain data. Optionally, the to-be-sent frequency-domain data having the length of 2N may be mapped to a frequency-domain resource corresponding to the to-be-sent frequency-domain data, then inverse Fourier transform is performed, and then cyclic prefix adding is performed to obtain time-domain data of a time-domain symbol.

S410. Send the time-domain data to the base station.

In addition, as can be learned from the foregoing descriptions, a ratio of the length of the first source data stream to the length of the second source data stream is (K−1):1. The length of the first source data stream indicates a quantity of pieces of data included in the first source data stream. The interval K in the first frequency-domain data stream is adjusted, so that the ratio of the length of the first source data stream to the length of the second source data stream can be adjusted, to flexibly adapt to different application scenarios. In different scenarios, when the reference signal and the to-be-sent data are frequency-divided in a same symbol, requirements on a ratio of power of the reference signal to power of the to-be-sent data are different. For example, when a channel state is very desirable and a signal to noise ratio (Signal to Noise Ratio, SNR) is relatively high, channel estimation may be relatively accurate, and a ratio of the power of the reference signal to the power of the to-be-sent data may be reduced. To be specific, when total power remains unchanged, the power of the reference signal is reduced. For example, when the first source data stream is modulated data and there is a large amount of to-be-sent data, for an allocated bandwidth, the value of K may be increased, so that the mount of to-be-transmitted data is increased. When a channel state is relatively poor and an SNR is relatively low, a ratio of the power of the reference signal to the power of the to-be-sent data may be increased, that is, the power of the reference signal is increased, to improve channel estimation performance.

In addition, signaling may be used to indicate whether the first source data stream corresponding to the first frequency-domain data stream is a reference signal stream or a modulated data stream, to adapt to different scenarios. For example, in a scenario in which a channel state is very poor, channel estimation performance needs to be improved to ensure demodulation performance of a receiver. In this case, the first source data stream corresponding to the first frequency-domain data stream may be a reference signal stream. To be specific, when the first source data stream is a reference signal stream, compared with that the second source data stream corresponding to the second frequency-domain data stream is a reference signal stream, power of a transmitted reference signal is higher, thereby improving channel estimation performance.

Figure 5B:
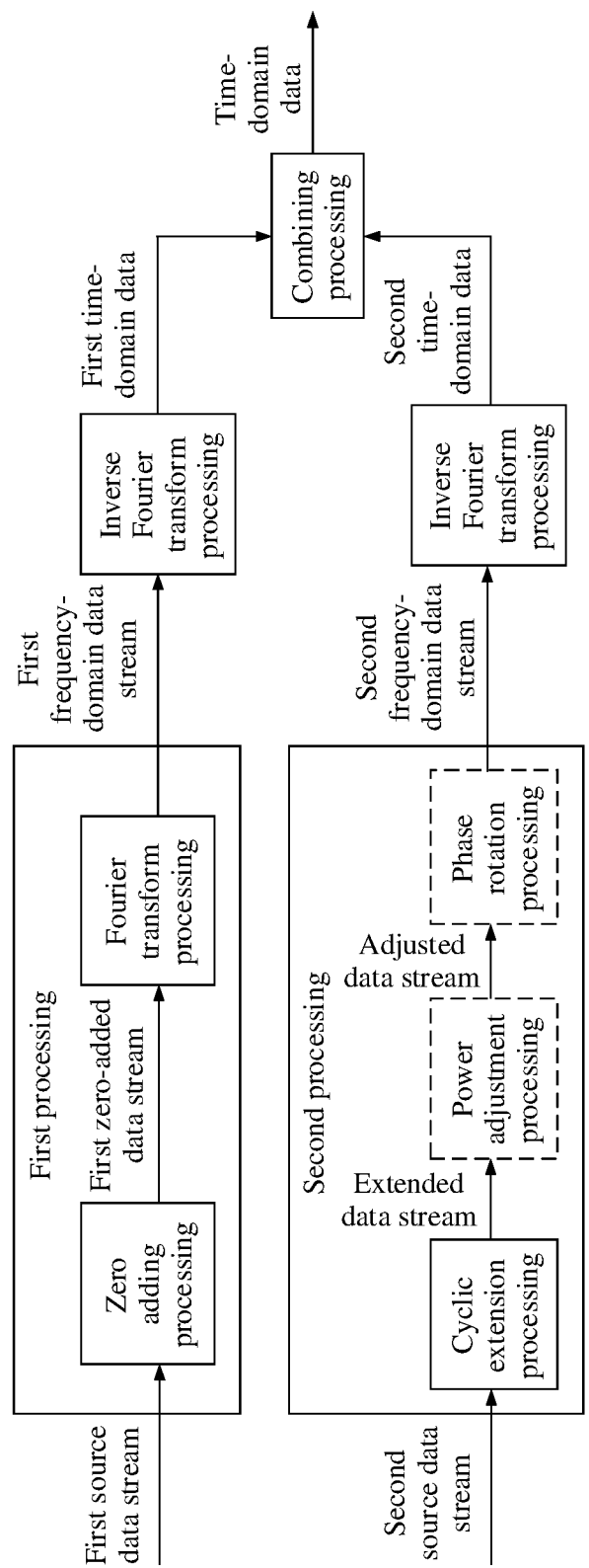
FIG. 5b is a schematic flowchart of another data stream processing in the method shown in FIG. 4.

FIG. 5b is a schematic flowchart of another data stream processing. As shown in FIG. 5b, a difference from FIG. 5a lies in that before the first frequency-domain data stream and the second frequency-domain data stream are obtained, processing on the first source data stream and the second source data stream is the same as that in FIG. 5b. After the first frequency-domain data stream and the second frequency-domain data stream are obtained, inverse Fourier transform may be separately performed on the first frequency-domain data stream and the second frequency-domain data stream, to obtain first time-domain data and second time-domain data, and then combining processing is performed on the first time-domain data and the second time-domain data to obtain time-domain data through adding.

Optionally, in FIG. 4, FIG. 5a, and FIG. 5b, an example in which power adjustment processing is performed after cyclic extension processing is used for description. It should be noted that the power adjustment processing may be performed at another location, and the following provides descriptions.

The foregoing first processing and/or second processing may further include the power adjustment processing, and the power adjustment processing may enable the power ratio of the first frequency-domain data stream to the second frequency-domain data stream to be (K−1):1. For example, before the combining processing, a power ratio of the first frequency-domain data stream to the second frequency-domain data stream is (K−1):1.

Optionally, when the first processing includes power processing, the power processing may be performed before zero adding processing (which may be understood as performing the power adjustment processing on the first source data stream). After the zero adding processing and before Fourier transform processing (which may be understood as performing the power adjustment processing on the first zero-added data stream), or after the Fourier transform processing (which may be understood as performing the power adjustment processing on the first frequency-domain data stream before the combining processing).

Optionally, when the second processing includes power processing, the power processing may be performed before cyclic extension processing (which may be understood as performing power adjustment processing on the second source data stream). After the cyclic extension processing and before phase rotation processing (which may be understood as performing the power adjustment processing on the extended data stream), or after the phase rotation processing (which may be understood as performing the power adjustment processing on the second frequency-domain data stream before the combining processing).

Specifically, any one of the following manners may be used:

(1) The first processing includes power adjustment processing, for example, power adjustment is performed by using a first power adjustment factor, and the second processing includes power adjustment processing, for example, power adjustment is performed by using a first power adjustment factor, where a ratio of the first power adjustment factor to the second power adjustment factor is $1:1/\sqrt{K}$.

(2) The first processing includes power adjustment processing, for example, power adjustment is performed by using a first power adjustment factor, where the first power adjustment factor is $\sqrt{K}$.

(3) The second processing includes power adjustment processing, for example, power adjustment is performed by using a second power adjustment factor, where the second power adjustment factor is $1/\sqrt{K}$.

Optionally, when power adjustment processing is not performed, a length ratio of the first source data stream to the second source data stream is N(K−1)/K:N/K, that is, (K−1):1. The power ratio of the first source data stream to the second source data stream is basically the same as the length ratio, and therefore is also (K−1):1. Through power adjustment processing, the power ratio of the first frequency-domain data stream to the second frequency-domain data stream may still be (K−1):1. Therefore, a PAPR value basically remains unchanged after signal multiplexing.

Optionally, in FIG. 5b, power adjustment processing may be performed on the first time-domain data obtained after inverse Fourier transform is performed on the first frequency-domain data stream, and/or power adjustment processing may be performed on the second time-domain data obtained after inverse Fourier transform is performed on the second frequency-domain data stream. For content of performing power adjustment processing on the first time-domain data, refer to content in which the first processing includes power adjustment processing. For content of performing power adjustment processing on the second time-domain data, refer to content in which the second processing includes power adjustment processing.

The following describes a method for generating the first source data stream and the second source data stream in FIG. 4.

In a first implementation, the first source data stream corresponding to the first frequency-domain data stream is a reference signal stream, and the second source data stream corresponding to the second frequency-domain data stream is obtained by performing Fourier transform on a modulated data stream having a length of $M_1$, where a length of the Fourier transform is $M_1$.

In this case, the reference signal stream is a first reference signal stream, and the modulated data stream may be referred to as a second modulated data stream.

The reference signal stream may be determined based on a ZC (Zadoff Chu) sequence, or may be determined based on a sequence generated by a pseudo-random sequence. For example, the reference signal stream is determined based on a ZC sequence, and a root of the ZC sequence is q. In this case, a length of the ZC sequence is $N_{ZC}$, and does not exceed a maximum prime number of a length $M_0$ of the first source data stream. The ZC sequence $x_q$ may be represented as:

$$x_q(m') = e^{-j\frac{\pi \times q \times m' \times (m'+1)}{N_{ZC}}}, m' = 0, 1, 2, \ldots, N_{ZC} - 1.$$

$x_q(m')$ is $m'^{th}$ data in $x_q$.

In this case, the first source data stream may be represented as:

$$d_s^0(m) = x_q(m \bmod N_{ZC}), m = 0, 1, 2, \ldots, M_0 - 1.$$

The second source data stream corresponding to the second frequency-domain data stream is obtained by performing Fourier transform on the modulated data stream $d_{qam}^1(m)$, $m = 0, 1, 2, \ldots, M_1 - 1$ having the length of $M_1$. Optionally, the modulated data stream may be data modulated based on, for example, Pi/2-binary phase shift keying (Binary Phase Shift Keying, BPSK), quadrature phase shift keying (Quadrature Phase Shift Keyin, QPSK), 16 quadrature amplitude modulation (Quadrature Amplitude Modulation, 16QAM), 64 quadrature amplitude modulation (Quadrature Amplitude Modulation, 64QAM). In this case, as described above, $M_1 = N/K$, and an expression is as follows:

$$d_s^1(m') = \frac{1}{\sqrt{M_{scale}^{fft}}} \sum_{m=0}^{M_1} d_{qam}^1(m) e^{-\frac{j2\pi m'm}{M_1}}, m' = 0, 1, 2, \ldots, M_1 - 1.$$

$M_{scale}^{fft}$ scale is a coefficient for adjusting power of output data obtained through the Fourier transform, and $M_{scale}^{fft}$ is a real number, for example, $M_{scale}^{fft} = M_1$.

In a second implementation, the first source data stream corresponding to the first frequency-domain data stream is a modulated data stream, and the second source data stream corresponding to the second frequency-domain data stream is a reference signal stream.

In this case, the modulated data stream may be referred to as a first modulated data stream, and the reference signal stream is a second reference signal stream.

In this case, the length of the modulated data stream is $M_0 = N(K−1)/K$.

The modulated data stream may be data modulated based on, for example, Pi/2-BPSK, QPSK, 16QAM, or 64QAM.

The reference signal stream may be determined based on a ZC (Zadoff Chu) sequence, or may be determined based on a sequence generated by a pseudo-random sequence. The reference signal sequence is determined in the following two methods, as shown in the following.

One possible determining method is as follows:

For example, the reference signal sequence is determined based on a ZC sequence, and a root of the ZC sequence is q. In this case, a length $N_{ZC}$ of the ZC sequence is the same as the length $M_1$ of the first source data stream, that is, $N_{ZC} = M_1$. In this case, the length $M_1$ of the first source data stream is a prime number. In this case, as described above, $M_1 = N/K$, and the ZC sequence $x_q$ may be represented as:

$$x_q(m') = e^{-j\frac{\pi \times q \times m' \times (m'+1)}{N_{ZC}}}, m' = 0, 1, 2, \ldots, N_{ZC} - 1.$$

In this case, the first source data stream may be represented as:

$$d_s^1(m) = x_q(m \bmod N_{ZC}), m = 0, 1, 2, \ldots, M_1 - 1.$$

The other possible determining method is as follows:

For example, the reference signal sequence is determined based on a ZC sequence, and a root of the ZC sequence is q. In this case, the length $N_{ZC}$ of the ZC sequence is the same as the length $M_1$ of the second source data stream, that is, $N_{ZC} = M_1$. In this case, the length $M_1$ of the second source data stream is a prime number. Correspondingly, as can be learned, when the cyclic extension operation is sequentially performed on the second source data stream to obtain an extended data stream $d_{extension}(n)$ having the length of N, because N divided by $M_1$ is not an integer, the cyclic extension operation cannot be equivalent to an integer quantity of repeated operations. In this case, the cyclic extension operation may be considered as after a ZC sequence having a length of $M_1$ is repeated for $\lfloor N/M_1 \rfloor$ times, adding the first $N-\lfloor N/M_1 \rfloor$ pieces of data in the ZC sequence to the end of repeated data.

In addition, the foregoing modulated data stream is obtained by performing a bit-level operation on bit data included in a transport block (TB). A quantity of pieces of bit data included in the transport block may be referred to as a transport block size (TBS). The bit-level operation includes one or more of operations such as coding, rate matching, interleaving, scrambling, and modulation. The rate matching operation is extracting a specific quantity of bit data from the coded bit data to perform modulation (or bit data obtained after an operation such as scrambling and interleaving is performed on a coded bit), where a quantity of bits of the extracted bit data is determined based on an allocated bandwidth and a modulation scheme.

During determining of a transport block (TB) size corresponding to modulated data, the size may be determined based on the interval K and the quantity of subcarriers corresponding to the bandwidth allocated to the terminal.

For example, the transport block size is determined based on K and the quantity of subcarriers corresponding to the bandwidth allocated to the terminal, and the quantity of bit data extracted through rate matching may also be determined based on K and the allocated bandwidth. The transport block size may also be determined based on K, the quantity of subcarriers corresponding to the bandwidth allocated to the terminal, and a modulation scheme, and the quantity of bit data extracted through rate matching may also be determined based on K, the allocated bandwidth, and a modulation scheme. Assuming that the quantity of subcarriers corresponding to the bandwidth allocated to the terminal is $N_{SC}$, $N=N_{SC}/2$. For example, the second source data stream corresponding to the second frequency-domain data stream is obtained by performing Fourier transform on modulated data having a length of $M_1$. The modulated data has the length $M_1=N/K=N_{sc}/(2K)$. In this case, the transport block size may be determined based on the length $N_{sc}/(2K)$ of the modulated data corresponding to the second source data stream, or may be determined based on the length $N_{sc}/(2K)$ of the modulated data corresponding to the second source data stream and a modulation scheme. In this case, the quantity of bit data extracted through rate matching may be determined based on the length $N_{sc}/(2K)$ of the modulated data, or the quantity of bit data extracted through rate matching may be determined based on the length $N_{sc}/(2K)$ of the modulated data and a modulation scheme.

For an actual process of determining the transport block size, refer to a method in Long Term Evolution (Long Term Evolution, LTE). In LTE, a corresponding transport block size is found from a table based on a quantity of resource blocks (or a quantity of subcarriers) corresponding to an allocated bandwidth and a modulation scheme (BPSK, QPSK, 16QAM, 64QAM, or the like). Alternatively, refer to a method in NR. In NR, a transport block size is determined by using a formula based on a quantity of resource blocks (or a quantity of subcarriers) corresponding to an allocated bandwidth, a modulation scheme, and a bit rate. Therefore, in this embodiment of this application, a quantity of resource blocks (or a quantity of subcarriers) in LTE or NR may be replaced with the length $N_{sc}/(2K)$ of the modulated data corresponding to the second source data stream and then determining is performed according to an existing method. For example, it is defined in an NR standard that $n_{prb}$ is a quantity of resource blocks allocated to UE. When $n_{prb}$ is a quantity of resource blocks occupied by data of one symbol or a quantity of resource blocks occupied by a reference signal, it may be known that $n_{prb}=N_{SC}/12/2=N/12$, where it is assumed that one resource block includes 12 subcarriers in frequency domain. When $n_{prb}$ is a quantity of resource blocks occupied by data of one symbol and a reference signal, it may be known that $n_{prb}=N_{SC}/12$, where it is assumed that one resource block includes 12 subcarriers in frequency domain.

Figure 6:
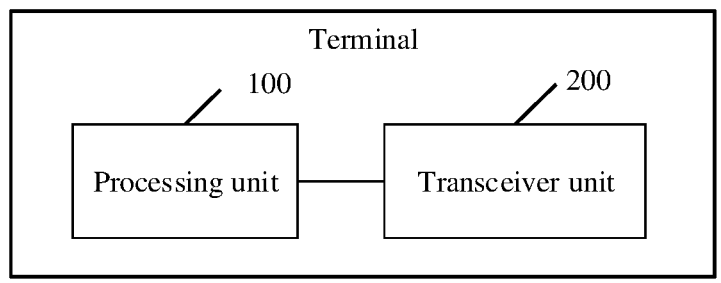
FIG. 6 is a schematic composition diagram of a terminal according to an embodiment of this application.

FIG. 6 is a schematic composition diagram of a terminal according to an embodiment of this application. The terminal may include: a processing unit 100, configured to: determine a third frequency-domain data stream, where the third frequency-domain data stream includes a first frequency-domain data stream and a second frequency-domain data stream, a length of the third frequency-domain data stream is 2N, lengths of both the first frequency-domain data stream and the second frequency-domain data stream are N, data in the first frequency-domain data stream and data in the second frequency-domain data stream are separately mapped to different locations in the third frequency-domain data stream, the first frequency-domain data stream is obtained by performing first processing on a first source data stream, the first processing includes zero adding processing and Fourier transform processing, the second frequency-domain data stream is obtained by performing second processing on a second source data stream, and the second processing includes cyclic extension processing; and convert the third frequency-domain data stream into time-domain data; and a transceiver unit 200, configured to send the time-domain data to a base station.

Optionally, a length of the first source data stream is $N(K-1)/K$, a length of the second source data stream is $N/K$, the zero adding processing includes adding $N/K$ zeros to the first source data stream to obtain a first zero-added data stream having a length of N, and locations of the N/K zeros in the first zero-added data stream are $k+p \times K$, where P is each integer from 0 to $N/K-1$, k is a value from 0 to $K-1$, k is an integer, N is a positive integer, and K is a positive integer greater than 1, where the Fourier transform processing includes performing Fourier transform processing on the first zero-added data stream.

Optionally, k=0.

Optionally, the transceiver unit 200 is further configured to: receive first indication information from the base station, where the first indication information indicates a value of K.

Optionally, a power ratio of the first frequency-domain data stream to the second frequency-domain data stream is $(K-1):1$.

Optionally, a power adjustment factor used in the power adjustment processing is $H=1/\sqrt{K}$.

Optionally, the second processing further includes phase rotation processing, and a phase rotation factor of the phase rotation processing is $$e^{j\alpha_k n} = e^{\frac{-j2\pi k n}{N}},$$

n=0, 1, 2, ..., N−1, e is a base of a natural logarithm, and j is an imaginary unit.

Optionally, the first source data stream is a modulated data stream, and the second source data stream is a second reference signal stream; or the first source data stream is a first reference signal stream, and the second source data stream is obtained by performing Fourier transform processing on a second modulated data stream.

Optionally, the transceiver unit 200 is further configured to: receive second indication information from the base station, where the second indication information indicates that the first source data stream is a first modulated data stream and the second source data stream is the second reference signal stream; or the second indication information indicates that the first source data stream is the first reference signal stream and the second source data stream is obtained by performing Fourier transform processing on the second modulated data stream.

Optionally, the data in the first frequency-domain data stream is mapped to an odd-number location in the third frequency-domain data stream, and the data in the second frequency-domain data stream is mapped to an even-number location in the third frequency-domain data stream; or the data in the first frequency-domain data stream is mapped to an even-number location in the third frequency-domain data stream, and the data in the second frequency-domain data stream is mapped to an odd-number location in the third frequency-domain data stream.

For concepts, explanations, detailed descriptions, and other steps of the terminal that are related to the technical solutions provided in the embodiments of this application, refer to descriptions about content in the foregoing method embodiments. Details are not described herein.

Figure 7:
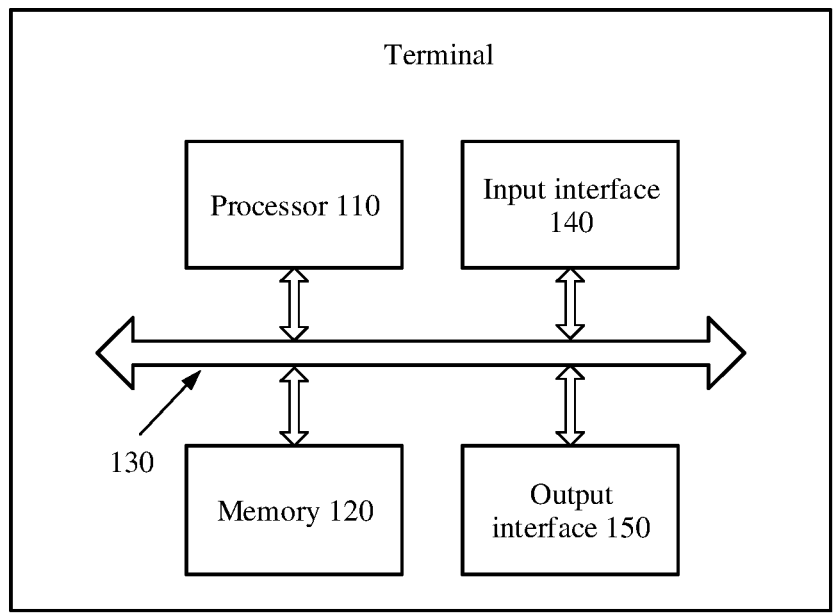
FIG. 7 is a schematic composition diagram of another terminal according to an embodiment of this application.

FIG. 7 is a schematic composition diagram of another terminal according to an embodiment of this application. As shown in FIG. 7, the terminal may include a processor 110, a memory 120, and a bus 130. The processor 110 is connected to the memory 120 by using the bus 130. The memory 120 is configured to store instructions. The processor 110 is configured to execute the instructions stored in the memory 120, to implement the steps in the methods corresponding to FIG. 2 to FIG. 5b.

Further, the terminal may further include an input interface 140 and an output interface 150. The processor 110, the memory 120, the input interface 140, and the output interface 150 may be connected by using the bus 130.

The processor 110 is configured to execute the instructions stored in the memory 120, to control the input interface 140 to receive a signal and control the output interface 150 to send a signal, to complete the steps performed by the terminal in the foregoing methods. The input interface 140 and the output interface 150 may be a same physical entity or different physical entities. When the input interface 140 and the output interface 150 are a same physical entity, the input interface 140 and the output interface 150 may be collectively referred to as an input-output interface. The memory 120 may be integrated into the processor 110, or may be disposed separately from the processor 110.

In an implementation, it may be considered that functions of the input interface 140 and the output interface 150 are implemented by using a transceiver circuit or a dedicated transceiver chip. It may be considered that the processor 110 is implemented by using a dedicated processing chip, a processing circuit, a processor, or a general-purpose chip.

In another implementation, it may be considered that the apparatus provided in this embodiment of this application is implemented by using a general-purpose computer. To be specific, program code for implementing functions of the processor 110, the input interface 140, and the output interface 150 is stored in the memory, and the general-purpose processor implements the functions of the processor 110, the input interface 140, and the output interface 150 by executing the code in the memory.

Figure 8:
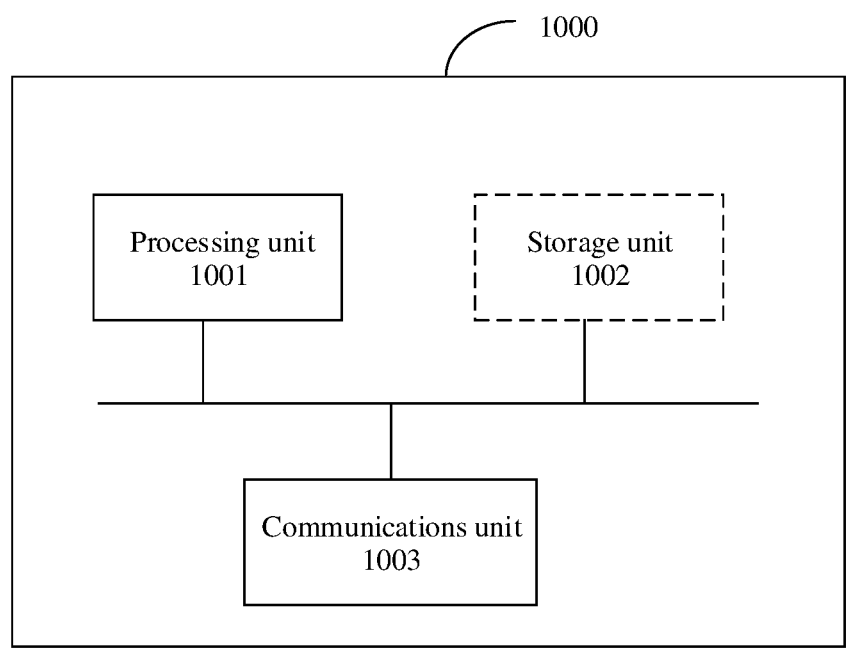
FIG. 8 is a schematic composition diagram of a communications apparatus according to an embodiment of this application.

FIG. 8 is a schematic composition diagram of a communications apparatus according to an embodiment of this application. A communications apparatus 1000 may be the terminal in the embodiments of this application or a chip in the terminal. Optionally, a communications unit 1003 of the communications apparatus 1000 may include an antenna and a transceiver of the terminal.

The communications apparatus 1000 may be a chip in the terminal in the embodiments of this application, and the communications unit 1003 may be an input interface or an output interface, a pin, a circuit, or the like. Optionally, a storage unit 1002 may store computer executable instructions related to the method executed on a terminal side, so that a processing unit 1001 performs the method on the terminal side in the foregoing embodiments. The storage unit 1002 may be a register, a cache, a RAM, or the like, and the storage unit 1002 may be integrated with the processing unit 1001. The storage unit 1002 may be a ROM or another type of static storage device that may store static information and static instructions, and the storage unit 1002 may be independent of the processing unit 1001. Optionally, with development of wireless communications technologies, a transceiver may be integrated with the communications apparatus 1000. For example, the communications unit 1003 is integrated with a transceiver and a network interface.

When the communications apparatus 1000 is the terminal in the embodiments of this application or a chip in the terminal, the method performed by the terminal in the foregoing embodiments may be implemented.

The processing unit 1001 may generate a first source data stream and a second source data stream. The processing unit 1001 may perform the first processing and the second processing in FIG. 2 to FIG. 5b. For example, the processing unit 1001 may perform zero adding processing on the first source data stream to obtain a first zero-added data stream, and perform Fourier transform processing on the first zero-added data stream to obtain a first frequency-domain data stream. The processing unit 1001 may perform cyclic extension processing on the second source data stream to obtain a second frequency-domain data stream. The processing unit 1001 may perform resource mapping on the first frequency-domain data stream and the second frequency-domain data stream, to obtain a third frequency-domain data stream. The processing unit 1001 may perform inverse Fourier transform processing on the third frequency-domain data stream to obtain time-domain data. For a specific processing process, refer to related content in descriptions in FIG. 2 to FIG. 5b.

The storage unit 1002 may store various data streams or data in a process of generating the time-domain data. For example, the storage unit 1002 may store one or more of the first source data stream, the first zero-added data stream, the second source data stream, an extended data stream, an adjusted data stream, the second frequency-domain data stream, the third frequency-domain data stream, and the time-domain data.

The communications unit 1003 may send the time-domain data to the base station. For a receiving process and a sending process, refer to related content in descriptions in FIG. 2 to FIG. 5b.

For concepts, explanations, detailed descriptions, and other steps of the apparatus that are related to the technical solutions provided in the embodiments of this application, refer to descriptions about content in the foregoing method embodiments or other embodiments. Details are not described herein.

A person skilled in the art may understand that, for ease of description, FIG. 7 shows only one memory and one processor. In an actual controller, there may be a plurality of processors and memories. The memory may also be referred to as a storage medium, a storage device, or the like. This is not limited in the embodiments of this application.

It should be understood that in the embodiment of this application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, discrete hardware component, or the like. The general purpose processor may be a microprocessor, or the processor may be any conventional processor or the like.

The memory may include a read-only memory and a random access memory, and provide instructions and data to the processor. A part of the memory may further include a non-volatile random access memory.

The bus may further include a power bus, a control bus, a status signal bus, and the like, in addition to a data bus. However, for clear description, various types of buses in the figure are marked as the bus.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

According to the method provided in the embodiments of this application, an embodiment of this application further provides a system, including the foregoing apparatus and one or more network devices.

It should be further understood that first, second, third, fourth, and various numbers in this specification are merely for distinguishing for ease of description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by a terminal, a third frequency-domain data stream, wherein the third frequency-domain data stream comprises a first frequency-domain data stream and a second frequency-domain data stream, a length of the third frequency-domain data stream is 2N, a length of the first frequency-domain data stream is N and a length of the second frequency-domain data stream is N, N is a positive integer, data in the first frequency-domain data stream and data in the second frequency-domain data stream are separately mapped to different locations in the third frequency-domain data stream, the first frequency-domain data stream is obtained by performing first processing on a first source data stream, the first processing comprises zero adding processing and Fourier transform processing, the second frequency-domain data stream is obtained by performing second processing on a second source data stream, and the second processing comprises cyclic extension processing;

converting, by the terminal, the third frequency-domain data stream into time-domain data; and sending, by the terminal, the time-domain data to a base station; and wherein:

a length of the first source data stream is N (K−1)/K, a length of the second source data stream is N/K, the zero adding processing comprises adding N/K zeros to the first source data stream, to obtain a first zero-added data stream having a length of N, and locations of the N/K zeros in the first zero-added data stream are k+p×K, wherein p is each integer from 0 to N/K−1, k is a value from 0 to K−1, k is an integer, and K is a positive integer greater than 1; and the Fourier transform processing is performed on the first zero-added data stream.

2. The method according to claim 1, wherein k=0.

3. The method according to claim 1, further comprising: receiving first indication information from the base station, wherein the first indication information indicates a value of K.

4. The method according to claim 1, wherein a power ratio of the first frequency-domain data stream to the second frequency-domain data stream is (K−1):1.

5. The method according to claim 4, wherein the second processing further comprises power adjustment processing, and a power adjustment factor used in the power adjustment processing is H=1/√K.

6. The method according to claim 1, wherein the second processing further comprises phase rotation processing, and a phase rotation factor of the phase rotation processing is $$e^{j\alpha_k n} = e^{\frac{-j2\pi k n}{N}},$$

n=0, 1, 2, . . . , N−1, e is a base of a natural logarithm, and j is an imaginary unit.

7. The method according to claim 1, wherein:

the first source data stream is a first modulated data stream, and the second source data stream is a second reference signal stream; or the first source data stream is a first reference signal stream, and the second source data stream is obtained by performing Fourier transform processing on a second modulated data stream.

8. The method according to claim 7, further comprising: receiving second indication information from the base station, wherein:

the second indication information indicates that the first source data stream is the first modulated data stream and the second source data stream is the second reference signal stream.

9. The method according to claim 1, wherein:

the data in the first frequency-domain data stream is mapped to odd-number locations in the third frequency-domain data stream, and the data in the second frequency-domain data stream is mapped to even-number locations in the third frequency-domain data stream; or the data in the first frequency-domain data stream is mapped to even-number locations in the third frequency-domain data stream, and the data in the second frequency-domain data stream is mapped to odd-number locations in the third frequency-domain data stream.

10. The method according to claim 7, further comprising: receiving second indication information from the base station, wherein:

the second indication information indicates that the first source data stream is the first reference signal stream and the second source data stream is obtained by performing Fourier transform processing on the second modulated data stream.

11. A terminal, comprising:

a processor;

a non-transitory computer readable storage medium storing a program that is executable by the processor, the program including instructions for:

determining a third frequency-domain data stream, wherein the third frequency-domain data stream comprises a first frequency-domain data stream and a second frequency-domain data stream, a length of the third frequency-domain data stream is 2N, a length of the first frequency-domain data stream is N and a length of the second frequency-domain data stream is N, data in the first frequency-domain data stream and data in the second frequency-domain data stream are separately mapped to different locations in the third frequency-domain data stream, the first frequency-domain data stream is obtained by performing first processing on a first source data stream, the first processing comprises zero adding processing and Fourier transform processing, the second frequency-domain data stream is obtained by performing second processing on a second source data stream, and the second processing comprises cyclic extension processing; and converting the third frequency-domain data stream into time-domain data; and a transceiver, configured to send the time-domain data to a base station; and wherein:

a length of the first source data stream is N (K−1)/K a length of the second source data stream is N/K, the zero adding processing comprises adding N/K zeros to the first source data stream, to obtain a first zero-added data stream having a length of N, and locations of the N/K zeros in the first zero-added data stream are k+p×K, wherein P is each integer from 0 to N/K−1, k is a value from 0 to K−1, k is an integer, N is a positive integer, and K is a positive integer greater than 1; and the Fourier transform processing is performed on the first zero-added data stream.

12. The terminal according to claim 11, wherein k=0.

13. The terminal according to claim 11, wherein the transceiver is further configured to:

receive first indication information from the base station, wherein the first indication information indicates a value of K.

14. The terminal according to claim 11, wherein a power ratio of the first frequency-domain data stream to the second frequency-domain data stream is (K−1):1.

15. The terminal according to claim 14, wherein the second processing further comprises power adjustment processing, and a power adjustment factor used in the power adjustment processing is $H=1/\sqrt{K}$.

16. The terminal according to claim 11, wherein the second processing further comprises phase rotation processing, and a phase rotation factor of the phase rotation processing is $$e^{j\alpha_k^n} = e^{\frac{-j2\pi kn}{N}},$$

n=0, 1, 2, . . . , N−1, e is a base of a natural logarithm, and j is an imaginary unit.

17. The terminal according to claim 11, wherein:
the first source data stream is a first modulated data stream, and the second source data stream is a second reference signal stream; or
the first source data stream is a first reference signal stream, and the second source data stream is obtained by performing Fourier transform processing on a second modulated data stream.

18. The terminal according to claim 17, wherein the transceiver is further configured to:
receive second indication information from the base station, wherein:
the second indication information indicates that the first source data stream is the first modulated data stream and the second source data stream is the second reference signal stream.

19. The terminal according to claim 11, wherein:
the data in the first frequency-domain data stream is mapped to odd-number location sin the third frequency-domain data stream, and the data in the second frequency-domain data stream is mapped to even-number locations in the third frequency-domain data stream; or
the data in the first frequency-domain data stream is mapped to even-number locations in the third frequency-domain data stream, and the data in the second frequency-domain data stream is mapped to odd-number locations in the third frequency-domain data stream.

20. The terminal according to claim 17, wherein the transceiver is further configured to:
receive second indication information from the base station, wherein:
the second indication information indicates that the first source data stream is the first reference signal stream and the second source data stream is obtained by performing Fourier transform processing on the second modulated data stream.

* * * * *

UNITED STATES PATENT AND TRADEMARK OFFICE
CERTIFICATE OF CORRECTION

PATENT NO. : 12,063,135 B2
APPLICATION NO. : 17/333852
DATED : August 13, 2024
INVENTOR(S) : Hu et al.

It is certified that error appears in the above-identified patent and that said Letters Patent is hereby corrected as shown below:

In the Claims

In Column 26, in Claim 11, Line 47, after "(K–1)/K" insert -- , --.

In Column 26, in Claim 11, Line 53, after "wherein" delete "P" and insert -- p --.

Signed and Sealed this
Seventeenth Day of September, 2024

Katherine Kelly Vidal
*Director of the United States Patent and Trademark Office*